United States Patent [19]

Birum et al.

[11] Patent Number: 4,639,480

[45] Date of Patent: Jan. 27, 1987

[54] POLYESTER COMPOSITIONS CONTAINING A PHTHALIMIDE

[75] Inventors: Gail H. Birum, Kirkwood; Thomas C. Mathis, St. Louis; Richard D. Stolk, Manchester, all of Mo.

[73] Assignee: Monsanto Company, St. Louis, Mo.

[21] Appl. No.: 736,004

[22] Filed: May 17, 1985

[51] Int. Cl.4 .................................................. C08K 5/34
[52] U.S. Cl. ...................................... 524/104; 524/605
[58] Field of Search ............................................ 524/104

[56] References Cited

U.S. PATENT DOCUMENTS

| | | | |
|---|---|---|---|
| 3,386,795 | 6/1968 | Caldwell et al. | 524/104 |
| 3,575,931 | 4/1971 | Sherman | 524/104 |
| 3,579,363 | 5/1971 | Sears | 106/176 |
| 3,615,793 | 10/1971 | Sears | 106/176 |
| 3,652,312 | 3/1972 | Sears | 106/176 |
| 4,305,864 | 12/1981 | Griffin | 525/437 |
| 4,313,903 | 2/1982 | Bier | 264/328 |
| 4,352,904 | 10/1982 | Deyrup | 524/292 |
| 4,378,444 | 3/1983 | Barenberg et al. | 524/169 |
| 4,399,244 | 8/1983 | Bier | 524/89 |

FOREIGN PATENT DOCUMENTS 1224721  3/1971  United Kingdom .

OTHER PUBLICATIONS

CA., Thermoplastic Molding Compositions Based on Saturated Polyesters; vol. 72;79907u; 1970.

*Primary Examiner*—Lewis T. Jacobs
*Attorney, Agent, or Firm*—Jon H. Beusen; P. D. Matukaitis; A. H. Cole

[57] ABSTRACT

Disclosed are compositions of polyethylene terephthalate and certain N-substituted phthalimide plasticizers, particularly polyethylene terephthalate molding compositions additionally containing a reinforcing agent and a nucleating agent.

13 Claims, No Drawings

POLYESTER COMPOSITIONS CONTAINING A PHTHALIMIDE

BACKGROUND OF THE INVENTION

This invention relates to polyester compositions. Particularly, the invention relates to polyethylene terephthalate compositions containing certain phthalimide compounds, as plasticizers, and more particularly to compositions for molding engineering thermoplastic parts.

Polyalkylene terephthalates have long been used for the manufacture of various molded articles. Such polymers, particularly when combined with reinforcing materials and fillers such as glass fibers, are suitable for the manufacture of engineered thermoplastic molded articles due to their high wear resistance, durability and high dimensional accuracy. These good physical properties are most readily achieved by molding a composition containing reinforcing material, under conditions under which the polyalkylene terephthalates become partially crystalline.

Of the polyalkylene terephthalates, polyethylene terephthalate imparts preferred physical properties to the molded article. However, polyethylene terephthalate is often not the material of choice for injection molding usage because relatively high mold temperatures, e.g., 120° C. to 140° C., must be utilized to ensure good moldability and to obtain the desired crystallinity. Because of the high temperatures required, relatively long molding times are necessary. These stringent processing conditions often prevent the use of polyethylene terephthalate for injection molding in spite of its high rigidity and good heat distortion temperature. Other polyester polymers, particularly polybutylene terephthalate require shorter molding times and lower molding temperatures because of their higher inherent rate of crystallization. However, these polymers are inferior to polyethylene terephthalate in their physical properties, particularly in their heat distortion temperature.

Thus, it is desirable to produce a polyethylene terephthalate molding composition that will crystallize at lower temperatures. This lowering of crystallization temperature must be accomplished without unduly adversely affecting the physical properties of the molded article. Additionally, any additive that improves crystallization must have sufficiently low volatility so that it does not volatilize out of the composition at elevated processing temperatures, and so that it does not cause deposits on the mold surfaces. The phthalimide compounds of the invention reduce the molding time and temperatures of polyethylene terephthalate compositions by improving and reducing the lower temperature at which crystallization occurs during cooling of the melt. Furthermore, such phthalimide compounds also result in polyethylene terephthalate compositions with low volatility, good physical properties, and high gloss.

SUMMARY OF THE INVENTION

The present invention provides a polyester composition comprising:

(a) from about 40 to about 95 parts by weight of a polyethylene terephthalate having an intrinsic viscosity of at least about 0.4 deciliter/gram measured as a 0.5% by weight solution in a 60:40 mixture of phenol and tetrachloroethane at 25° C.; and (b) from about 0.5 to about 15 parts by weight of a plasticizer comprising a phthalimide of the formula:

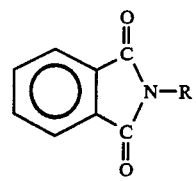

where R is an alkyl, alkenyl, alkaryl, or alkoxy alkyl group with from 12 to 30 carbon atoms, preferably 14 to 26 carbon atoms.

In a preferred embodiment, the present invention comprises a polyester molding composition comprising:

(a) from about 40 to about 95 parts by weight of a polyethylene terephthalate having an intrinsic viscosity of at least about 0.4 deciliter/gram measured as a 0.5% by weight solution in a 60:40 mixture of phenol and tetrachloroethane at 25° C.;

(b) from about 0.5 to about 15 parts by weight of a plasticizer comprising a phthalimide as defined above;

(c) from about 0.1 to about 10.0 parts by weight of a nucleating agent;

(d) from about 5 to about 60 parts by weight of a reinforcing agent.

This invention also provides a molded, shaped article prepared from the polyester molding composition described above.

This invention also provides a process for the preparation of polyester compositions wherein from about 40 to about 95 parts by weight of a polyethylene terephthalate having an intrinsic viscosity of at least about 0.4, preferably at least about 0.6 deciliters per gram is mixed with from about 0.5 to about 15 parts by weight of a phthalimide as defined above, and homogenized in a melt.

DETAILED DESCRIPTION OF THE INVENTION

The polyethylene terephthalate used in preparing the polyester compositions of the invention has an intrinsic viscosity of at least about 0.4 deciliters per gram when measured as a 0.5% by weight solution in a 60:40 mixture of phenol and tetrachloroethane at 25° C. It is preferred that the intrinsic viscosity should be about 0.6 deciliters per gram and in some instances an intrinsic viscosity of about 1.0 or more deciliters per gram may be desirable. As used herein, the term "polyethylene terephthalate" includes polyethylene terephthalate as well as polyethylene terephthalate copolymers and polymer blends containing polyethylene terephthalate, provided the copolymer or polymer blend is at least about 60% by weight polyethylene terephthalate. Preferred copolymers include those in which a portion of the ethylene glycol is replaced by other polyhydric alcohols, including, but not limited to, propylene glycol and butylene glycol, and in which a portion of the terephthalic acid is replaced by other polyfunctional carboxylic acids. Suitable polymer blends include physical mixtures of polyethylene terephthalate with other polymers, particularly other polyesters. The polyethylene terephthalate is used in the molding composition in an amount of from about 50 to about 95 parts by weight, preferably about 60 to about 90 parts by weight.

The phthalimide compounds of this invention comprise compounds of the general formula:

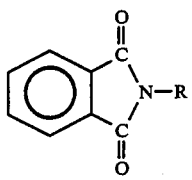

wherein R is an alkyl, alkenyl, alkaryl, or alkoxy alkyl group with from 12 to 30 carbon atoms, preferably 14 to 26 carbon atoms.

Phthalimide compounds which fall within the above general formula include, N-alkyl phthalimides, such as N-dodecyl phthalimide, N-tridecyl phthalimide, N-tetradecyl phthalimide, N-pentadecyl phthalimide, N-hexadecyl phthalimide, N-heptadecyl phthalimide, N-octadecyl phthalimide, N-nonyldecyl phthalimide, N-eicosyl phthalimide, N-docosyl phthalimide, and the like, up to N-triacontyl phthalimide. Also included are mixed N-alkyl phthalimides, such as hydrogenated N-tallow and N-soya phthalimide, N-eicosyl and N-docosyl phthalimide mixtures, and the like. Also included are N-alkenyl phthalimides, such as unhydrogenated N-tallow and N-soya phthalimides, and the like; alkaryl phthalimides, such as dodecylphenyl phthalimide and the like; N-alkoxy alkyl phthalimides, such as N-tetradecyloxypropyl phthalimide, and the like; as well as mixtures of these N-alkyl, N-alkenyl, N-alkaryl, and N-alkoxy alkyl phthalimides.

The amount of phthalimide in the composition ranges from about 0.1 to about 15 parts by weight, preferably, from about 3 to about 10 parts by weight. These phthalimide compounds have excellent compatability with polyethylene terephthalate. However, the concentration of phthalimide should be kept below a level at which incompatability may occur under the conditions to which the composition will be exposed.

The N-substituted phthalimides useful in this invention can be produced by any method known in the art. One particularly useful method is reaction of phthalic anhydride with the corresponding primary amine. The reaction can be carried out in a suitable solvent, such as toluene or xylene, or it can be conducted in the absence of a solvent, if the amine used is a liquid and provides a suitable reaction medium. The reaction proceeds readily, and the product can often be used with no purification other than stripping out the water produced as a by-product and stripping out the solvent, if a solvent is used.

One class of suitable amines is alkyl amines. Branched or straight chain alkyl amines can be used with straight chain amines being preferred. These amines include, but are not limited to dodecylamine, tetradecylamine, hexadecylamine, etc., up to a maximum of 30 carbon atoms in the alkyl group. Also useful are mixtures of amines, such as hydrogenated tallow amine, which is a mixture primarily of $C_{14}$ to $C_{18}$ alkyl amines, hydrogenated soya amine, which is a mixture primarily of $C_{16}$ to $C_{18}$ alkyl amines, a mixture containing primarily $C_{18}$ to $C_{22}$ alkyl amines, or other mixtures of $C_{12}$ to $C_{30}$ alkyl amines. Such mixtures of alkyl amines can conveniently be obtained by conversion of oils from plant and animal sources.

Alkaryl amines suitable for use in producing the phthalimides useful with this invention include dodecylphenyl amine and other alkaryl primary amines.

Alkenyl amines suitable for use in producing the phthalimides useful with this invention include unhydrogenated tallow and soya amines and other mixtures of $C_{12}$ to $C_{30}$ alkenyl amines. These amine mixtures can also be obtained by conversion of oils from plant and animal sources.

Suitable alkoxyalkyl amines include ether amines of the formula $NH_2$—$R^1$—O—$R^2$, where the total number of carbons in $R^1$ plus $R^2$ is from 12 to 30 carbon atoms, preferably 14 to 26 carbon atoms or primary amine derivatives of polyalkoxy ethers, of the formula $NH_2R^3$—$OR^3$—$OR^4$, where the total number of carbon atoms is from 14 to 30. A preferred class of aminopolyalkoxy ethers includes monoamine derivatives of polyethylene glycol, which are sold by Texaco Chemical Company under the tradename Jeffamine, such as Jeffamine M-360.

Any nucleating agents suitable for use in polyalkylene terephthalate molding compositions may be utilized in the molding compositions of the invention. All that is required is that the nucleating agent promote nucleation of the polyethylene terephthalate crystals. Most nucleating agents raise the upper temperature at which crystallization of the polyethylene terephthalate occurs as the melt cools. Suitable nucleating agents include organic and inorganic nucleators.

Inorganic nucleating agents include calcium salts, such as calcium terephthalate, calcium titanate, calcium pyrophosphate, calcium silicate, calcium benzoate, calcium oxide, calcium carbonate, calcium fluoride, calcium aluminosilicate, and the like. Sodium salts, such as sodium silicate, sodium phenyl phosphate, and sodium aluminosilicate may be used. Other inorganic nucleating agents include salts of other metals, such as lithium, potassium, rubidium and cesium, as well as other inorganic compounds such as zinc borate and zeolites.

One suitable class of inorganic nucleating agents include monovalent metal salts of oxides of carbon, silicon, germanium, tin, and lead. The preferred oxides are those of carbon and silicon, with carbon oxides such as carbonate and bicarbonate being particularly preferred. Preferred monovalent metals include lithium, sodium, potassium, rubidium, and cesium, with lithium, sodium and potassium being preferred, and sodium being particularly preferred.

Other suitable nucleating agents include the sodium or potassium, or other metal salts of hydrocarbon carboxylic acids. One class of suitable carboxylic acids contains between 7 and 25 carbon atoms, preferably more than 12 carbon atoms. Representative of these carboxylic acids are fatty acids, such as stearic, pelargonic and behenic acid. Additionally, salts of ethylenediaminetetraacetic acid may be suitable nucleating agents, particularly the sodium salt. These carboxylic acid salts also include the sodium or potassium salts of carboxyl containing organic polymers, either fully or partially neutralized, such as copolymers of olefins or aromatic olefins with acrylic or methacrylic acids or maleic anhydride. These polymeric materials include, for example, the sodium or potassium salt of ethylene methacrylic acid copolymers or styrene maleic anhydride copolymers, including both wholly or partially neutralized salts of each. In the copolymers above, the olefin or aromatic olefin moiety ordinarily comprises 50% to 98% by weight of the copolymer and, preferably, 80% to 98%. An especially preferred polymeric material is the sodium salt of ethylene methacrylic acid copolymer. Also included are salts of oligomers of unsaturated fatty acids, particularly dimers and trimers of $C_{18}$ fatty acids, commonly known as "dimer acid" and "trimer acid."

A preferred class of nucleators, whether organic or inorganic, is alkali metal salts and mixed salts containing alkali metals. Preferred alkali metals are sodium and potassium, with sodium being particularly preferred.

In general, any suitable reinforcing agent can be used in the molding compositions of the invention. The reinforcing agent may optionally be treated with various coupling agents or adhesion promoters in a manner in which is well known to those skilled in the art. Examples of suitable reinforcing agents include glass fibers, carbon fibers and filaments, aramid fibers, alumina, feldspar, asbestos, talc, calcium carbonates, clay, carbon black, quartz, novaculite and other forms of silica, galenite, bentonite, garnet, mica, saponite, beidellite, titanium dioxide and titanate whiskers, aluminum, iron or nickel fibers, whiskers or platelets, vermiculite, calcium metasilicate, and the like. In particular, the preferred reinforcing agent is glass fiber, more particularly glass fibers, comprised of lime-aluminum borosilicate glass that is relatively sodium free, commonly known as "E" glass. In some instances, it also may be desirable to use a mixture of reinforcing agents such as a mixture of glass fibers and mica.

Other optional additives may be included in the compositions of the invention. For example, the compositions of the invention may also include a chain extender which helps to compensate for polyester chains which are broken by hydrolysis with resulting molecular weight degradation. Such chain extenders include, for example, carbodiimides and polyepoxides. Epoxy resins, which are preferred, include an epoxy formed from bisphenol-A and glycidol ether or polyepoxides obtained by reacting ortho cresol novolac and epichlorohydrin. Especially preferred polyepoxides are epoxy cresol novolac resins. If a chain extender is used, it is preferred that about 0.1 to about 5 parts by weight be used. Other optional additives may include impact modifiers, mold release agents, anti-static agents, coloring agents, such as pigments and dyes, thermal oxidative and light stabilizers, flame retardants and other additives known in the art.

The molding compositions of the invention can be prepared and molded using any conventional or well-known method. For example, in one suitable method the polyethylene terephthalate and glass fiber are placed into an extrusion compounder to produce molding pellets. In another procedure, the polyalkylene terephthalate and glass are mixed by dry blending, then either milled and comminuted or extruded and chopped. Alternatively, the ingredients can be mixed with the powdered or granular polyalkylene resin and directly molded by injection or transfer molding techniques. Ordinarily, it is desirable to thoroughly free the ingredients from as much water as possible.

It is preferred that compounding be carried out to ensure that the residence time in the molding machine is short; the temperature is carefully controlled; friction heat is utilized; and an intimate blend between the additives and the polyester resin is obtained.

Although it is not essential, best results are obtained if the ingredients are precompounded, pelletized and then molded. Precompounding can be carried out in conventional equipment. For example, after predrying the polyalkylene terephthalate, e.g., at 130° C. for three hours, a single screw extruder may be fed with a dry blend of the polyester resin and the glass and whatever other additives may be used. Alternatively, a twin-screw extrusion machine can be fed with polyalkylene terephthalate, glass fiber and other additives at the feed port. In either case, a generally suitable extruder temperature will be about 230° C. to 300° C.

The molding compositions of this invention can be molded in any equipment conventionally used for molding engineering thermoplastic compositions, using conventional techniques.

The phthalimide compounds of this invention act to improve the crystallization of the polyethylene terephthalates to which they are added by decreasing the temperature to which crystallization will continue upon cooling of the hot melt. Although not intending to be bound by theory, it is believed that the phthalimides improve crystallization by increasing the molecular mobility of the polymer chain.

Additionally, the phthalimides of this invention result in improved melt flow and in improved processability of polyethylene terephthalate compositions, intended for molding or other applications. As a result, the phthalimides can also be considered to be a flow aid or processing aid for polyethylene terephthalate.

Because the phthalimides of this invention decrease the temperature at which crystallization occurs, good heat distortion temperatures (HDT), gloss and other physical properties can be obtained at a lower molding temperature. Also, smaller amounts of nucleating agents may be used without any loss of nucleating effectiveness.

The compositions of this invention can be prepared using compounding techniques known in the art. They may either be precompounded and pelletized, or mixed and compounded as part of the molding process. It is preferred to precompound and pelletize the composition prior to molding. Precompounding can be accomplished with a single screw extruder, dual screw extruder, a roller mill, or any other method known to one skilled in the art.

The following examples are illustrative of this invention and are not intended to limit its scope.

In the examples, the following components were used: the polyethylene terephthalate (PET) used had an intrinsic viscosity of about 0.66 deciliters/gram; the indicated plasticizer; as a nucleator, an ethylene/methacrylic acid (85/15 by weight) partially neutralized to a sodium salt, sold by duPont under the tradename Surlyn 8660; as a chain extender, a polyglycidyl ether of orthocresolformaldehyde novolac, sold by Ciba-Geigy Corporation, under the tradename Araldite ECN 1273; and ⅛-inch (0.3175 cm) chopped glass strand, sold by Pittsburgh Plate Glass and designated as product type 3540. Compositions were made using plasticizer at concentrations of 3% and 5% by weight based on PET. These formulations, expressed as a percentage of the full formulation are as follows:

|  | % Plasticizer Based on PET | |
|---|---|---|
|  | 3% | 5% |
| PET | 67.0 | 65.6 |
| Plasticizer | 2.0 | 3.4 |
| Nucleator | 0.67 | 0.67 |
| Chain Extender | 0.33 | 0.33 |
| Glass | 30.0 | 30.0 |

The dried components were mixed and extruded in a single screw extruder, with a die temperature of about 260° C. The extruded ribbon was cooled, chopped into pellets and dried overnight. The dried, pelletized composition was injection molded into a family mold, at a die temperature of about 275° C. and a mold surface temperature of 110° C. The closed time was 30 seconds.

The molded parts were tested to determine heat deflection temperature (HDT) by holding the specimen at two support points separated by five inches (12.7 cm), raising the temperature 2° C. per minute, and applying a load of 264 psi (1.26 kPa) at the midpoint. The temperature at which deformation of the specimen reaches 0.01 inches (0.0254 cm) is the HDT. This is in accordance with ASTM D648-82. Tensile strength and % elongation were determined using ASTM D638-82. Izod impact was determined using ASTM D256-81, except that unnotched test specimens were used. Volatility of the compounded PET was determined by heating for 4 hours at 175° C. on a rotating rack in a forced draft oven.

The $T_{pk}$ of the composition was determined by placing a sample of a molded part into the sample container of a differential scanning calorimeter, that had been heated to about 290° C. After 2 minutes, the sample container was removed and covered with powdered dry ice to "quench" the sample. The quenched sample was dessicated a minimum of 5 minutes, then returned to the calorimeter that had been cooled to room temperature. The calorimeter was programmed for a 10° C. per minute temperature increase under a nitrogen atmosphere. An exotherm was observed between about 100° C. and about 125° C. The $T_{pk}$ is the temperature at which heat evolves most rapidly during this exotherm. The $T_{pk}$ gives an indication of the effectiveness of the plasticizer at enhancing crystallization with a lower $T_{pk}$ indicating greater effectiveness.

Additionally, the per se volatility of the indicated plasticizer was determined by thermogravimetric analysis of the neat plasticizer, under air atmosphere, using a thermobalance with a programmed temperature rise of 10° C. per minute. The thermobalance produced a plot of weight loss versus temperature. From this plot, the temperature at which volatility losses began was determined, as well as the weight percent loss at 300° C. and 350° C.

EXAMPLES 1–7

A series of PET molding compositions was prepared as above, using 3% plasticizer by weight, based on PET. Example 1 used a mixture of about 5% $C_{14}$, about 30% $C_{16}$, and about 65% $C_{18}$ N-alkyl phthalimide; Example 2 used N-n-octadecyl phthalimide; Example 3 used N-dodecylphenyl phthalimide; Example 4 used a mixture of about 1% $C_{14}$, about 16% $C_{16}$, and about 82% $C_{18}$ N-alkenyl phthalimide; Example 5 used a phthalimide prepared from a polyethoxy ether monoamine, sold by Texaco Chemical Company under the tradename Jeffamine M-360; Example 6, a comparative example, used a mixture of about 5% $C_{14}$, about 30% $C_{16}$, and about 65% $C_{18}$ N-alkyl toluenesulfonamide, and Example 7, a comparative example used neopentyl glycol dibenzoate. The properties of the plasticizers and of the formulated PET are reported in Table I.

TABLE I

| Ex. No. | Mol. Wt. | Melting Point (°C.) | Plasticizer Volatility | | | | HDT (°C.) | Izod Impact (ft. lbs/in) | Tensile Properties | | Vol. Loss PET Form. at 175° C. (mg/sq. cm.) |
| --- | --- | --- | --- | --- | --- | --- | --- | --- | --- | --- | --- |
| | | | Loss Begins (°C.) | % Loss 300° C. | % Loss 350° C. | $T_{pk}$ (°C.) | | | Strength (psi) | % Elong. | |
| 1 | 397 | ~67 | 240 | 10 | 39 | 114.0 | 213 | 12.7 | 20,100 | 2.3 | 0.52 |
| 2 | 400 | 80 | 235 | 12 | 38 | 113.5 | 214 | 12.0 | 20,100 | 2.4 | 0.52 |
| 3 | 392 | 114 | 245 | 11 | 34 | 117.0 | 212 | 12.9 | 20,700 | 2.4 | 0.43 |
| 4 | 418 | semi-* solid | 240 | 2 | 16 | 115.0 | 214 | 11.8 | 19,100 | 2.2 | 0.49 |
| 5 | ~505 | liquid* | 185 | 43 | 85 | 115.5 | 215 | 12.3 | 20,100 | 2.3 | 0.27 |
| 6 | 418 | 68–70 | 265 | 2 | 16 | 115.5 | 209 | 12.3 | 19,600 | 2.4 | 0.39 |
| 7 | 312 | 49 | 210 | 23 | 96 | 115.5 | 208 | 12.3 | 19,700 | 2.3 | 0.54 |

*At room temperature.

EXAMPLES 8 and 9

Examples 8 and 9 were prepared and molded as above, with 5% plasticizer, by weight based on PET. The plasticizer used in Example 8 was the same as that of Example 1; and the plasticizer used in Example 9, a comparative example, was similar to that of Example 6 except a different lot was used. The results are shown in Table II.

TABLE II

| Ex. No. | Melting Point (°C.) | $T_{pk}$ (°C.) | Vol. Loss PET Form. at 175° C. (mg/sq. cm.) | Izod Impact (ft. lbs./in.) |
| --- | --- | --- | --- | --- |
| 8 | ~67 | 109 | .63 | 14.1 |
| 9 | 68–70 | 109 | .52 | 14.2 |

EXAMPLES 10–13

Examples 10–13 were prepared and molded as above, with 5% plasticizer, by weight based on PET. The plasticizer used in Example 10 is a mixture of about 6% $C_{16}$, about 20% $C_{18}$, about 38% $C_{20}$, about 34% $C_{22}$, and about 2% $C_{24}$ N-alkyl phthalimide; the plasticizer in Example 11 was N-tetradecyloxypropane phthalimide; the plasticizer in Example 12, a comparative example, was the same as that used in Example 9, and Example 13, a comparative example, used no plasticizer. The results are shown in Table III.

TABLE III

| Ex. No | Mol Wt. | Melting Point (°C.) | $T_{pk}$ (°C.) | Vol. Loss PET Form. at 175° C. (mg/sq. cm.) | Izod Impact (ft. lbs./in.) |
| --- | --- | --- | --- | --- | --- |
| 10 | ~415 | 58–68 | 108.5 | .56 | 12.7 |
| 11 | 386 | 50–56 | 107.5 | .80 | 12.5 |
| 12 | 418 | 68–70 | 108.5 | .55 | 13.5 |
| 13 | — | — | 121.5 | .04 | 14.5 |

EXAMPLES 14–20

Examples 14–20 were prepared as above using 5% plasticizer, by weight based on PET. Example 14 used N-dodecyl phthalimide. Example 15 used the same plasticizer as Example 1. Example 16 used a mixture of about 6% $C_{18}$, about 45% $C_{20}$ and about 46% $C_{22}$ N-alkyl phthalimide. Example 17, a comparative example, used N-2-ethylhexyl phthalimide. Example 18, a comparative example, used the same plasticizer as Example 9. Example 19, a comparative example, used the same plasticizer as Example 7. Example 20 used no plasticizer. The results are shown in Table IV.

TABLE IV

| Ex. No. | Mol. Wt. | Melting Point (°C.) | Plasticizer Volatility | | | | HDT (°C.) | Izod Impact (ft. lbs./in.) | Tensile Properties | | Vol. Loss PET Form. at 175° C. (mg/sq. cm.) |
| | | | Loss Begins (°C.) | % Loss 300° C. | % Loss 350° C. | $T_{pk}$ (°C.) | | | Strength (psi) | % Elong | |
| --- | --- | --- | --- | --- | --- | --- | --- | --- | --- | --- | --- |
| 14 | 315 | 64–68 | 230 | 20 | 66 | 108.5 | 213 | 12.2 | 19,500 | 2.0 | 0.98 |
| 15 | 397 | ~67 | 240 | 10 | 39 | 106.5 | 214 | 12.2 | 18,750 | 2.1 | 0.80 |
| 16 | ~415 | 58–70 | 230 | 14 | 48 | 109.0 | 215 | 12.1 | 19,500 | 2.1 | 0.60 |
| 17 | 259 | ~28 | 140 | 53 | 96 | 109.5 | 211 | 11.2 | 19,250 | 2.0 | 0.84 |
| 18 | 418 | 68–70 | 265 | 2 | 16 | 107.5 | 210 | 11.0 | 19,000 | 2.2 | 0.58 |
| 19 | 312 | 49 | 210 | 23 | 96 | 111.0 | 204 | 13.4 | 20,350 | 2.2 | 0.79 |
| 20 | — | — | — | — | — | 120.5 | 202 | 14.2 | 18,900 | 2.0 | 0.15 |

What is claimed is:

1. A polyester molding composition, comprising:
   (a) from about 40 to about 95 parts by weight of a polyethylene terephthalate having an intrinsic viscosity of at least 0.4 deciliter/gram measured as a 0.5% by weight solution in a 60:40 mixture of phenol and tetrachloroethane at 25° C.; and
   (b) from about 0.5 to about 15 parts by weight of a plasticizer comprising a phthalimide, of the formula:

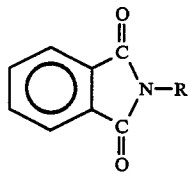

where R is alkyl, alkenyl, or alkoxy alkyl with from 12 to 30 carbon atoms.

2. A polyester molding composition comprising:
   (a) from about 40 to about 95 parts by weight of a polyethylene terephthalate having an intrinsic viscosity of at least about 0.4 deciliter/gram measured as a 0.5% by weight solution in a 60:40 mixture of phenol and tetrachloroethane at 25° C.;
   (b) from about 0.1 to about 10.0 parts by weight of a nucleating agent;
   (c) from about 5 to about 60 parts by weight of a reinforcing agent;
   (d) from about 0.5 to about 15 parts by weight of a plasticizer comprising a phthalimide compound of the general formula

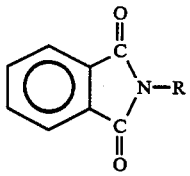

wherein R is an alkyl, alkenyl, or alkoxy alkyl group with from 12 to 30 carbon atoms.

3. The composition of claim 2 wherein the phthalimide compound is an N-alkyl phthalimide.

4. The composition of claim 3 wherein the N-alkyl phthalimide contains an alkyl group with from 14–16 carbon atoms.

5. The composition of claim 2 wherein the nucleating agent is selected from the salt of a dimer acid, the salt of a trimer acid or the salt of a mixture of a dimer acid and a trimer acid.

6. The composition of claim 2 wherein the nucleating agent is a copolymer consisting essentially of 85 wt. % ethylene and 15 wt. % methacrylic acid which has been partially neutralized with sodium ions.

7. The composition of claim 2 wherein the reinforcing agent is fiberglass.

8. The composition of claim 2 containing from about 0.1 to about 5 parts by weight of a chain extender.

9. The composition of claim 8 wherein the chain extender is a polyepoxide.

10. The composition of claim 2 wherein the polyethylene terephthalate has an intrinsic viscosity of at least about 0.6.

11. The composition of claim 2 wherein the polyethylene terephthalate comprises a mixture of polyethylene terephthalate and polybutylene terephthalate.

12. The composition of claim 2 further comprising at least one additive selected from impact modifiers, flow promoters, coloring agents, flame retardants, coupling agents and stabilizers for thermal oxidative and light stabilization in effective amounts.

13. A polyester molding composition comprising: (a) from about 40 to about 95 parts by weight of polyethylene terephthalate having an intrinsic viscosity of at least about 0.4 deciliters per gram; (b) from about 0.5 to about 5.0 parts by weight of a nucleating agent; (c) from about 5 to about 60 parts by weight of fiberglass; (d) from about 0.5 to about 15 parts by weight of a plasticizer comprising a phthalimide compound of the general formula:

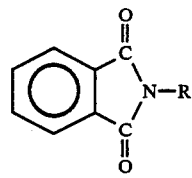

wherein R is an alkyl group with from 14 to 26 carbon atoms.

* * * * *